(12) United States Patent
Petropulu et al.

(10) Patent No.: US 12,704,587 B2
(45) Date of Patent: Aug. 11, 2026

(54) JOINT SENSING AND COMMUNICATIONS USING OFDM WAVEFORMS

(71) Applicant: Rutgers, The State University of New Jersey, New Brunswick, NJ (US)

(72) Inventors: Athina Petropulu, New Brunswick, NJ (US); Zhaoyi Xu, New Brunswick, NJ (US)

(73) Assignee: Rutgers, The State University of Jersey, Brunswick, NJ (US)

( * ) Notice: Subject to any disclaimer, the term of this patent is extended or adjusted under 35 U.S.C. 154(b) by 427 days.

(21) Appl. No.: 17/860,060

(22) Filed: Jul. 7, 2022

(65) Prior Publication Data

US 2023/0032493 A1 Feb. 2, 2023

Related U.S. Application Data

(60) Provisional application No. 63/219,217, filed on Jul. 7, 2021.

(51) Int. Cl.
*G01S 7/00* (2006.01)
*G01S 13/58* (2006.01)
(Continued)

(52) U.S. Cl.
CPC ............ *G01S 7/006* (2013.01); *G01S 13/584* (2013.01); *H04L 27/2627* (2013.01); *H04L 27/36* (2013.01)

(58) Field of Classification Search
None
See application file for complete search history.

(56) References Cited

U.S. PATENT DOCUMENTS

2016/0254889 A1* 9/2016 Shattil .................. H04L 5/0035 370/329

FOREIGN PATENT DOCUMENTS

KR 20110039574 A * 10/2024
RU 2693848 C1 * 7/2019 ........... H04B 7/0486
WO WO-2020212569 A1 * 10/2020

OTHER PUBLICATIONS

Wymeersch, Henk et al., "5G mmWave Positioning for Vehicular Networks," IEEE Wireless Communications, vol. 24, No. 6, pp. 80-86, Dec. 2017.

(Continued)

*Primary Examiner* — Resha Desai
*Assistant Examiner* — Brandon James Henson
(74) *Attorney, Agent, or Firm* — Meagher Emanuel Laks Goldberg & Liao, LLP

(57) ABSTRACT

Various embodiments comprise systems, methods, architectures, mechanisms and apparatus providing a dual-function radar communication (DFRC) system a multiple-input multiple-output (MIMO) radar is configured to have only a small number of its antennas active in each channel use. Probing waveforms are of an orthogonal frequency division multiplexing (OFDM) type. OFDM carriers are divided into two groups, one group that is used by the active antennas in a shared fashion, and another group where each subcarrier is assigned to an active antenna in an exclusive fashion (e.g., private subcarriers). Target estimation is carried out based on the received and transmitted symbols. The system communicates information via the transmitted OFDM data symbols and the pattern of active antennas in a generalized spatial modulation (GSM) fashion. A multi-antenna communication receiver can identify the indices of active antennas via sparse signal recovery methods. The private subcarriers may be used to synthesize a virtual array for high angular resolution, and also for improved estimation on the active antenna indices.

20 Claims, 6 Drawing Sheets

(51) Int. Cl.
*H04L 27/26* (2006.01)
*H04L 27/36* (2006.01)

(56) References Cited

OTHER PUBLICATIONS

Huang, Tianyao et al., "A Dual-Function Radar Communication System Using Index Modulation," 2019 IEEE 20th International Workshop on Signal Processing Advances in Wireless Communications (SPAWC), 2019.
Wang, Xiangrong et al., "Dual-Function MIMO Radar Communications System Design Via Sparse Array Optimization," IEEE Transactions on Aerospace and Electronic Systems, vol. 55, No. 3, pp. 1213-1226, Jun. 7, 2019.
Hassanien, Aboulnasr et al., "Dual-Function Radar Communication Systems: A solution to the spectrum congestion problem," IEEE Signal Processing Magazine, vol. 36, No. 5, pp. 115-126, Sep. 2019.
Xiao, Lixia et al., "Efficient Compressive Sensing Detectors for Generalized Spatial Modulation Systems," IEEE Transactions on Vehicular Technology, vol. 66, No. 2, pp. 1284-1298, Feb. 2017.
Liu, Fan et al., "Joint Radar and Communication Design: Applications, State-of-the-Art, and the Road Ahead," IEEE Transactions on Communications, vol. 68, No. 6, pp. 3834-3862, Jun. 2020.
Garcia-Rodriguez, Adrian and Masouros, Christos, "Low-Complexity Compressive Sensing Detection for Spatial Modulation in Large-Scale Multiple Access Channels," IEEE Transactions on Communications, vol. 63, No. 7, pp. 2565-2579, Jul. 2015.
Rong, Yu et al., "MIMO Radar And Communications Spectrum Sharing: A Multiple-Access Perspective," 2018 IEEE 10th Sensor Array and Multichannel Signal Processing Workshop (SAM), 2018.
Sun, Shunqiao et al., "MIMO Radar for Advanced Driver-Assistance Systems and Autonomous Driving: Advantages and Challenges," IEEE Signal Processing Magazine, vol. 37, No. 4, pp. 98-117, Jul. 2020.
Li, Jian and Stoica, Petre, "MIMO Radar with Colocated Antennas," IEEE Signal Processing Magazine, vol. 24, No. 5, pp. 106-114, Sep. 2007.
Li, Bo et al., "Optimum Co-Design for Spectrum Sharing between Matrix Completion Based MIMO Radars and a MIMO Communication System," IEEE Transactions on Signal Processing, vol. 64, No. 17, pp. 4562-4575, Sep. 1, 2016.
Liu, Yongjun et al., "Range and Angle Estimation for MIMO-OFDM Integrated Radar and Communication Systems," 2016 CIE International Conference on Radar (RADAR), 2016.
Rossi, Marco et al., "Spatial Compressive Sensing for MIMO Radar," IEEE Transactions on Signal Processing, vol. 62, No. 2, pp. 419-429, Jan. 15, 2014.
Mesleh, Raed Y. et al., "Spatial Modulation," IEEE Transactions on Vehicular Technology, vol. 57, No. 4, pp. 2228-2281, Jul. 2008.
Di Renzo, Marco et al., "Spatial Modulation for Generalized MIMO: Challenges, Opportunities, and Implementation," Proceedings of the IEEE, vol. 102, No. 1, pp. 56-103, Jan. 2014.
Mishra, Kumar Vijay et al., "Toward Millimeter-Wave Joint Radar Communications: A signal processing perspective," IEEE Signal Processing Magazine, vol. 36, No. 5, pp. 100-114, Sep. 2019.
Sturm, Christian and Wiesbeck, Werner, "Waveform Design and Signal Processing Aspects for Fusion of Wireless Communications and Radar Sensing," Proceedings of the IEEE, vol. 99, No. 7, pp. 1236-1259, May 27, 2011.

* cited by examiner

Target
&
Communication receiver
Activation code
10011101
....011001
....101001
105-1
105-Nt
110-1
110-Nt
S/P
QAM
120-1
120-Nt
IDFT
+
CP
130-1
130-Nt
P/S
140-1
140-Nt
D/A
150-1
150-Nt
160-1
160-Nt
160-Nr
A/D
170-1
170-Nr
180-1
180-Nr
DFT
190-1
190-Nr
Carrier
antenna
OFDM symbol
100

Figure 3:
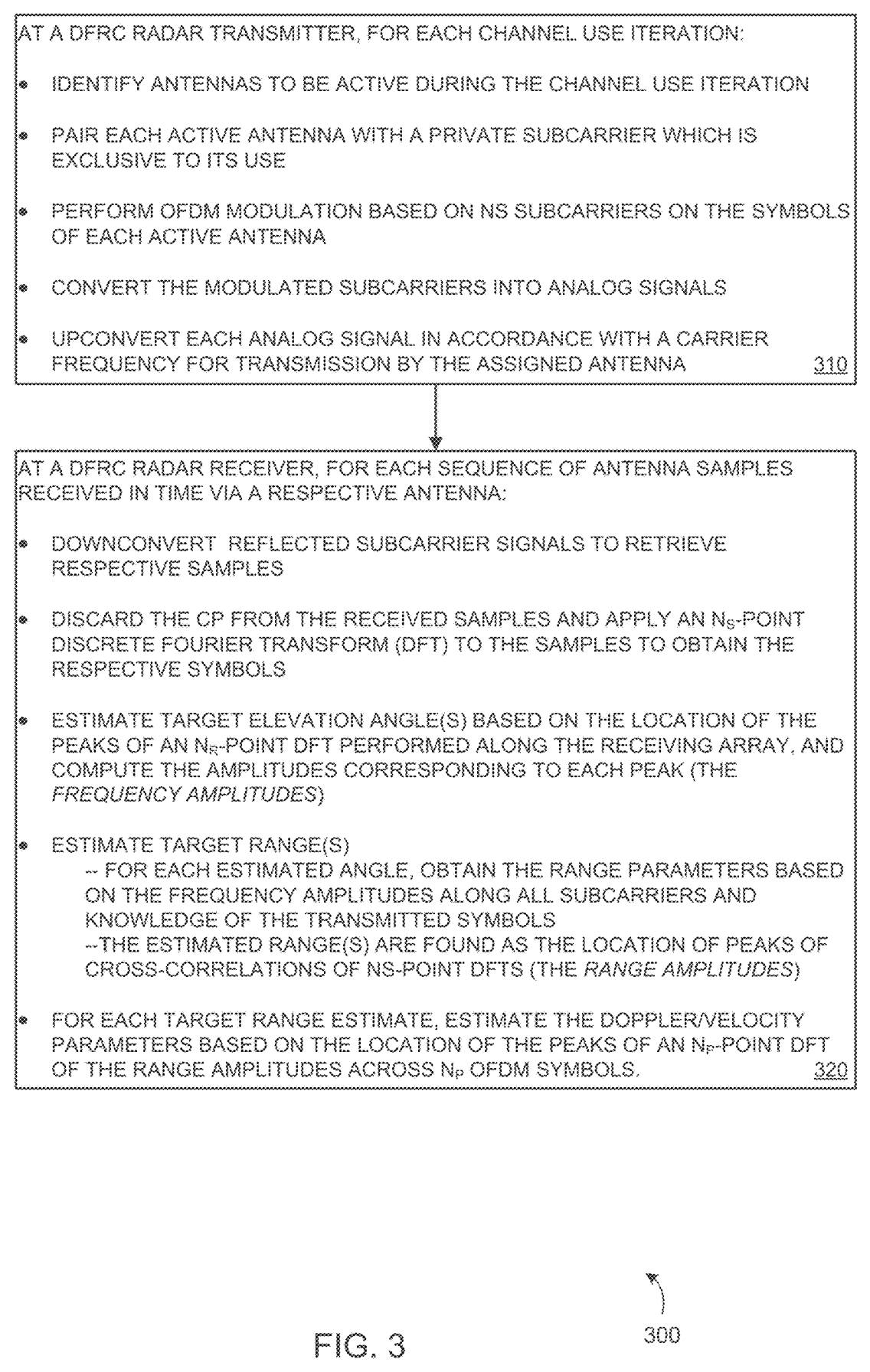

AT A DFRC RADAR TRANSMITTER, FOR EACH CHANNEL USE ITERATION:

- IDENTIFY ANTENNAS TO BE ACTIVE DURING THE CHANNEL USE ITERATION
- PAIR EACH ACTIVE ANTENNA WITH A PRIVATE SUBCARRIER WHICH IS EXCLUSIVE TO ITS USE
- PERFORM OFDM MODULATION BASED ON NS SUBCARRIERS ON THE SYMBOLS OF EACH ACTIVE ANTENNA
- CONVERT THE MODULATED SUBCARRIERS INTO ANALOG SIGNALS
- UPCONVERT EACH ANALOG SIGNAL IN ACCORDANCE WITH A CARRIER FREQUENCY FOR TRANSMISSION BY THE ASSIGNED ANTENNA

310

AT A DFRC RADAR RECEIVER, FOR EACH SEQUENCE OF ANTENNA SAMPLES RECEIVED IN TIME VIA A RESPECTIVE ANTENNA:

- DOWNCONVERT REFLECTED SUBCARRIER SIGNALS TO RETRIEVE RESPECTIVE SAMPLES
- DISCARD THE CP FROM THE RECEIVED SAMPLES AND APPLY AN $N_S$-POINT DISCRETE FOURIER TRANSFORM (DFT) TO THE SAMPLES TO OBTAIN THE RESPECTIVE SYMBOLS
- ESTIMATE TARGET ELEVATION ANGLE(S) BASED ON THE LOCATION OF THE PEAKS OF AN $N_R$-POINT DFT PERFORMED ALONG THE RECEIVING ARRAY, AND COMPUTE THE AMPLITUDES CORRESPONDING TO EACH PEAK (THE *FREQUENCY AMPLITUDES*)
- ESTIMATE TARGET RANGE(S)
  -- FOR EACH ESTIMATED ANGLE, OBTAIN THE RANGE PARAMETERS BASED ON THE FREQUENCY AMPLITUDES ALONG ALL SUBCARRIERS AND KNOWLEDGE OF THE TRANSMITTED SYMBOLS
  --THE ESTIMATED RANGE(S) ARE FOUND AS THE LOCATION OF PEAKS OF CROSS-CORRELATIONS OF NS-POINT DFTS (THE *RANGE AMPLITUDES*)
- FOR EACH TARGET RANGE ESTIMATE, ESTIMATE THE DOPPLER/VELOCITY PARAMETERS BASED ON THE LOCATION OF THE PEAKS OF AN $N_P$-POINT DFT OF THE RANGE AMPLITUDES ACROSS $N_P$ OFDM SYMBOLS.

Received symbol matrix $N_s$ Subcarriers $N_r$ Receive antennas

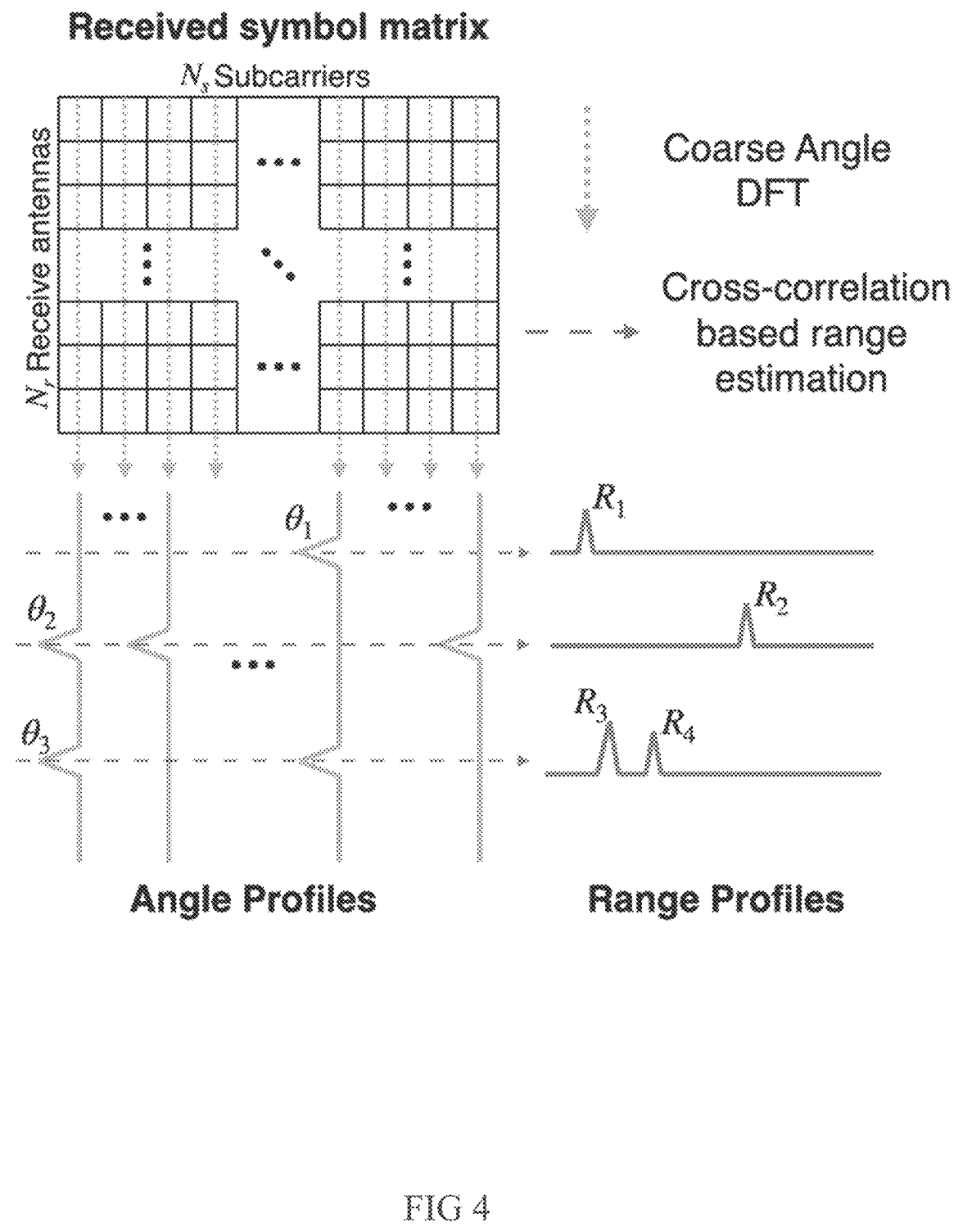

Coarse Angle DFT

Cross-correlation based range estimation $\theta_1$ $\theta_2$ $\theta_3$ $R_1$ $R_2$ $R_3$ $R_4$ Angle Profiles Range Profiles

FIG 4

JOINT SENSING AND COMMUNICATIONS USING OFDM WAVEFORMS

CROSS REFERENCE TO RELATED APPLICATION

This application claims the benefit of provisional patent application Ser. No. 63/219,217, filed on Jul. 7, 2021, entitled JOINT SENSING AND COMMUNICATIONS USING OFDM WAVEFORMS, which provisional patent application is incorporated herein by reference.

GOVERNMENT INTEREST

This invention was made with government support under grant number ECCS-2033433 awarded by the NSF. The government has certain rights in the invention.

FIELD OF THE DISCLOSURE

The present disclosure generally relates to signal processing and, in particular, to Dual-Function Radar and Communication system design.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Spectrum sharing between radar and communication systems aims at improving spectral efficiency. Dual-function radar-communication (DFRC) systems represent one form of spectrum sharing, by providing radar and communication functionalities on the same hardware platform and via the same waveform. Unlike approaches that consider spatially distributed radar and communication systems and require coordination of the two system functions by some external controllers, DFRC systems require less coordination. A DFRC system transmits probing waveforms that allow for estimating target angle, range, and velocity, while at the same time conveying information to a communication receiver. DFRC systems are applicable in many scenarios, including autonomous driving, where the radar functionality can be used for sensing and navigation and the communication functionality for vehicle to vehicle communication, or in advanced manufacturing applications, where networked robots involved in the manufacturing process sense the surroundings and communicate their findings with other robots.

Multiple-input multiple-output (MIMO) radar systems are good candidates for use in DFRC systems. They can form wide beams, thus allowing for the detection of multiple targets at the same time. Further, when using orthogonal waveforms, they can synthesize a virtual array that has a larger aperture than that of a uniform linear array (ULA) with the same number of physical elements. As a result, MIMO radar can achieve high angle resolution with a small number of antennas.

Orthogonal Frequency Division Multiplexing (OFDM) waveforms have been used in MIMO DFRC systems to achieve high sensing performance and communication rate. However, prior works assign subcarriers to transmit antennas in an exclusive fashion, which limits the system's ability to fully exploit the available bandwidth for communication purposes.

SUMMARY

Various deficiencies in the prior art are addressed by systems, methods, architectures, mechanisms and apparatus providing a dual-function radar communication (DFRC) system a multiple-input multiple-output (MIMO) radar is configured to have only a small number of its antennas active in each channel use. Probing waveforms are of an orthogonal frequency division multiplexing (OFDM) type. OFDM carriers are divided into two groups, one group that is used by the active antennas in a shared fashion, and another group where each subcarrier is assigned to an active antenna in an exclusive fashion (e.g., private subcarriers). Target estimation is carried out based on the received and transmitted symbols. The system communicates information via the transmitted OFDM data symbols and the pattern of active antennas in a generalized spatial modulation (GSM) fashion. A multi-antenna communication receiver can identify the indices of active antennas via sparse signal recovery methods. The private subcarriers may be used to synthesize a virtual array for high angular resolution, and also for improved estimation on the active antenna indices.

In one embodiment, a multiple-input multiple-output (MIMO) radar system, comprising: a uniform linear array (ULA) transmit array having $N_t$ active transmit elements, spaced apart by $d_t$; and a transmitter processing stage, configured for iteratively transmitting each of Ns symbol-bearing sections via respective active antennas: identifying antennas to be active during the channel use iteration; pairing at least one of the active antennas with a private subcarrier; performing OFDM modulation based on Ns subcarriers on the symbols of each active antenna; converting the modulated subcarriers into analog signals; and upconvert each analog signal in accordance with a carrier frequency for transmission by a respective assigned active antenna.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3 depicts a flow diagram of a method according to an embodiment;

FIG. 4 graphically depicts an angle and range estimation mechanism according to an embodiment;

Figure 1:
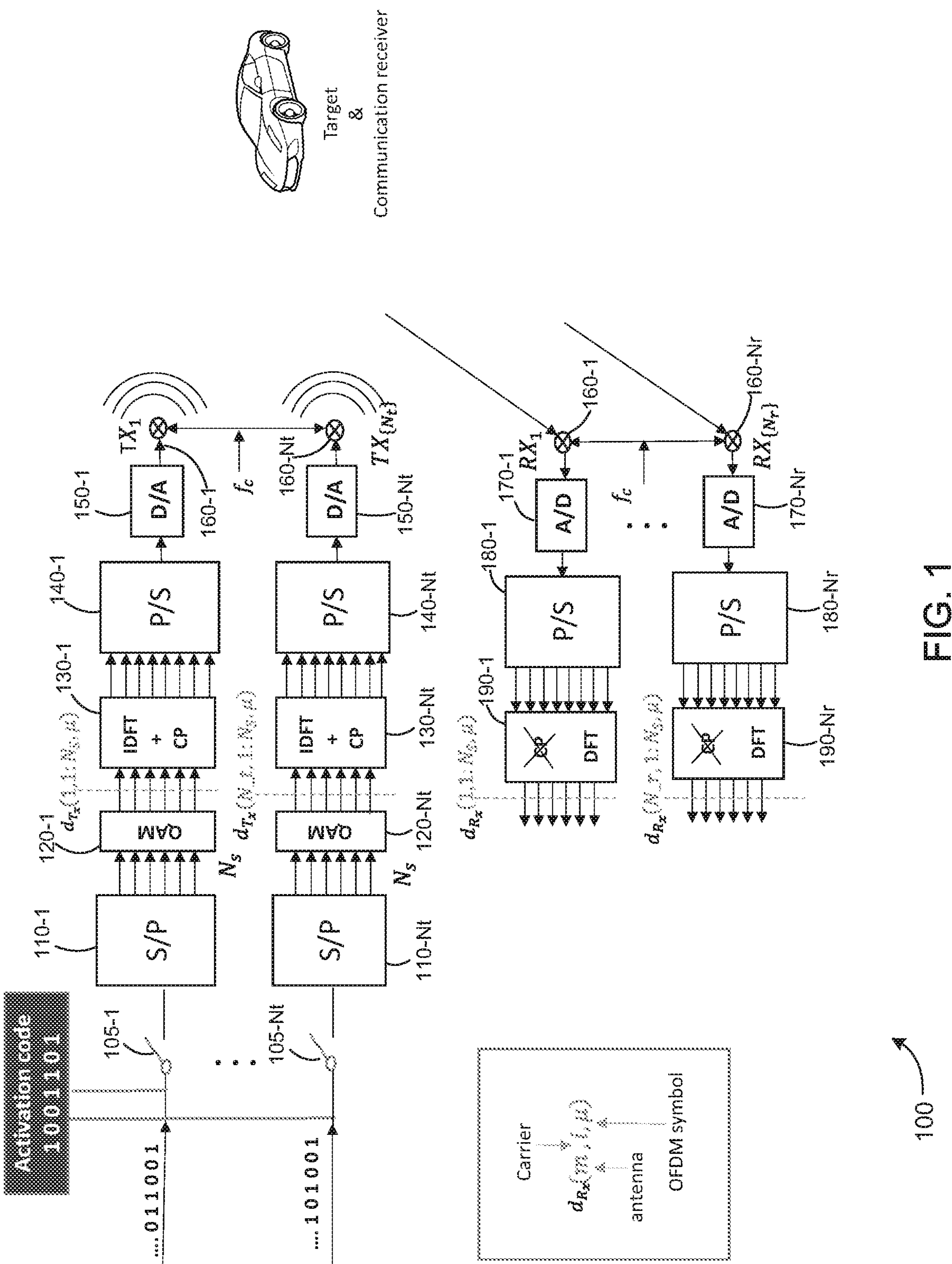
FIG. 1 depicts a high level block diagram of a dual-function radar communication (DFRC) system according to an embodiment.
Figure 2:
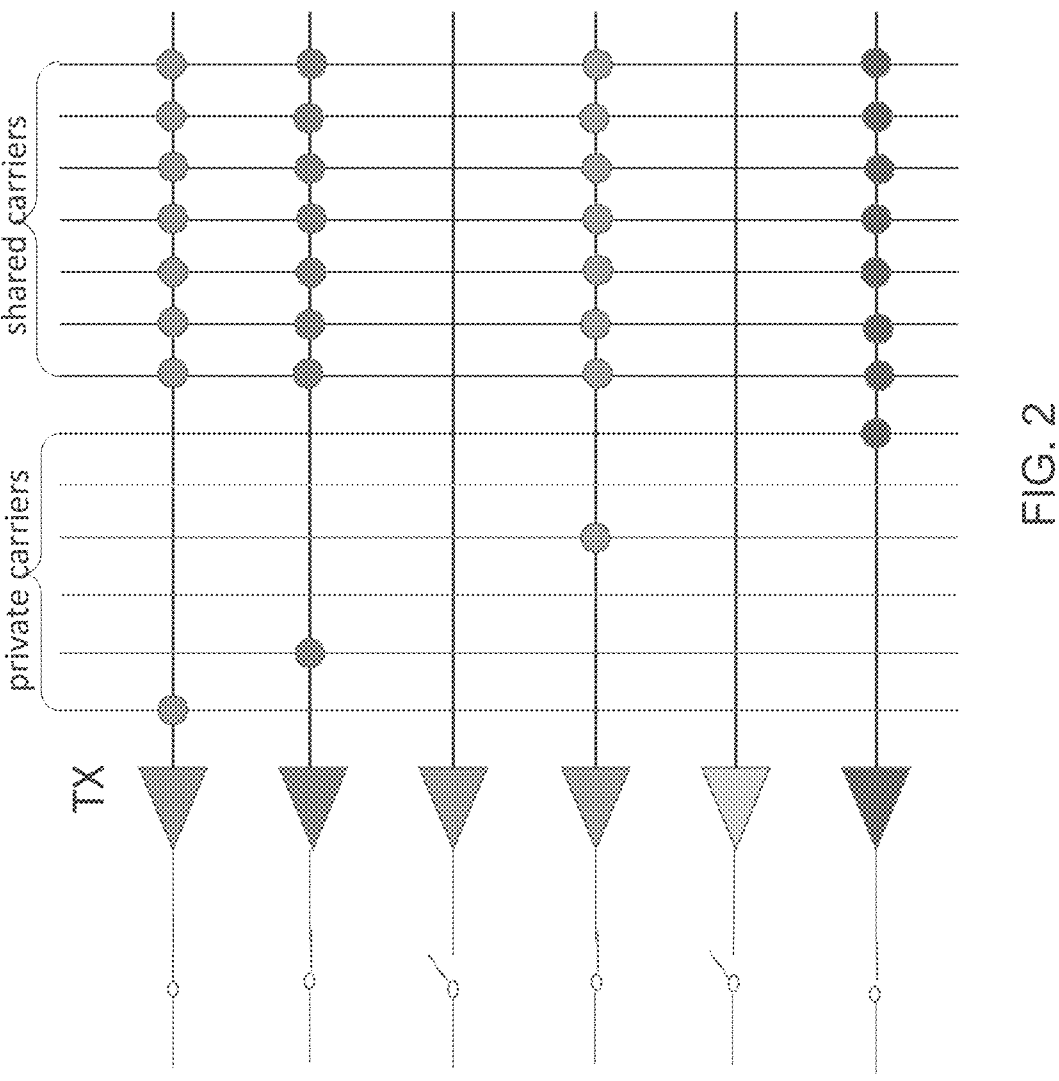
FIG. 2 graphically depicts the use of private and shared subcarriers in the DFRC system of FIG. 1.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a nonexclusive or, unless otherwise indicated (e.g., "or else" or "or in the alternative"). Also, the various embodiments described herein are not necessarily mutually exclusive, as some embodiments may be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments provide a dual-function radar communication (DFRC) system that achieves high target resolution and high communication rate, and may be configured in accordance with some or all of the follow: A multiple-input multiple-output (MIMO) radar is configured to have only a small number of its antennas active in each channel use. Probing waveforms are of an orthogonal frequency division multiplexing (OFDM) type. OFDM carriers are divided into two groups, one group that is used by the active antennas in a shared fashion, and another group where each subcarrier is assigned to an active antenna in an exclusive fashion (e.g., private subcarriers). Target estimation is carried out based on the received and transmitted symbols. The system communicates information via the transmitted OFDM data symbols and the pattern of active antennas in a generalized spatial modulation (GSM) fashion. A multi-antenna communication receiver can identify the indices of active antennas via sparse signal recovery methods. The use of shared subcarriers enables high communication rate. The private subcarriers are used to synthesize a virtual array for high angular resolution, and also for improved estimation on the active antenna indices. The OFDM waveforms allow the communication receiver to easily mitigate the effect of frequency selective fading, while the use of a sparse array at the transmitter reduces the hardware cost of the system.

An exemplary DRFC system will now be described in more detail. The exemplary DRFC system is based on a MIMO-OFDM radar where information is transmitted via OFDM symbols and optionally in a GSM fashion. The transmit antennas share subcarriers, which allows for high communication rate. Like existing MIMO-OFDM systems, full resolution range estimation is achieved. A subset of the private subcarriers may be used to construct a virtual array capable of obtaining high resolution target angle estimates, at the cost of a small reduction of the communication rate. Hardware costs may be reduced by having only a small number of antennas active in each channel use iteration.

Radar System

FIG. 1 depicts a high level block diagram of a dual-function radar communication (DFRC) system according to an embodiment. Specifically, the radar system 100 of FIG. 1 comprises a multiple-input multiple-output (MIMO) radar system with a uniform linear array (ULA) transmit array having $N_t$ transmit elements, spaced apart by $d_t$, and a ULA receive array with $N_r$ receive elements, spaced apart by $d_r$.

Referring to FIG. 1, transmitter processing is accomplished by controllably coupling via respective switches 105 one or more of a plurality (e.g., Nt) of serial input data streams/sequences to respective serial to parallel (S/P) converters 110-1 through 110-Nt (collectively S/P converters 110), which provide parallel output signals for processing by respective quadrature amplitude modulation (QAM) modulators 120-1 through 120-Nt (collectively QAM modulators 120). The resulting QAM modulated data symbol streams/sequences are further processed by inverse discrete Fourier transform (IDFT) processing and then by cyclic prefix (CP) prepending via respective IDFT/CP processors 130-1 through 130-N(collectively IDFT/CP processors 130), wherein the IDFT/CP processed QAM data symbol streams/sequences are converted from a parallel digital signal to a serial digital signal by respective parallel to serial (P/S) converters 140-1 through 140-Nt (collectively P/S converters 140), converted to analog transmission signals by respective digital to analog (D/A) converters 150-1 through 150-Nt (collectively D/A converters 150), and modulated/up-converted onto a carrier signal $f_c$ to provide respective transmission signals $TX_1$ through $TX_{Nt}$ for transmission via respective MIMO antennas 160-1 through 160-Nt (collectively antennas 160).

Referring to FIG. 1, receiver processing is accomplished by receiving target-reflected signals $RX_1$ through $RX_{Nr}$ via the respective MIMO antennas 160-1 through 160-Nr (collectively antennas 160), which are downconverted/demodulated to provide respective analog receiver signals which are converted to digital receiver signals via respective analog to digital (A/D) converters 170-1 through 170-Nr (collectively A/D converters 170), which are converted to parallel data streams by respective serial to parallel (S/P) converters 180-1 through 180-Nr (collectively S/P converters 180), and subjected to discrete Fourier transform (DFT) processing via respective DFT processors 190-1 through 190-Nr (collectively DFT processors 190).

In the transmit ULA, only $N_x$ antennas are active in each channel use. The specific antennas to be active during each channel use may be indicated via an activation code provided via the input signal path, a control path, or some other mechanism. Denoting by N the set of active antennas indices, it is assumed that the 0-th and the ($N_t$-1)-th elements always belong to N, so that the aperture of the sparse transmit array is fixed. The transmit waveforms are OFDM signals with $N_s$ subcarriers, with subcarrier spacing Δ. Each antenna applies an inverse discrete Fourier transform (IDFT) on the data symbols assigned to it, then pre-appends a cyclic prefix (CP), converts the samples into an analog signal, and transmits the analog signal with carrier frequency $f_c$. This signal will be referred to as an OFDM symbol. The length of the CP should be larger than the maximum roundtrip delay to the target, so that the inter-symbol interference and inter-channel interference can be eliminated in subsequent modulation symbol based radar processing.

The subcarriers are distributed to the transmit antennas in a manner that allows subcarrier sharing (i.e., more than one antenna transmitting on the same subcarrier simultaneously), which enables an increase in the communication rate. In particular, the carriers are divided into two groups; a first group of subcarriers that will be used in a shared manner by the active antennas, and a second group of subcarriers that will be used as private subcarriers.

Let $d_{T_x}(n, i, \mu)$ denote the data symbol transmitted by the n-th antenna ($n \in \mathcal{N}$) on the i-th subcarrier, during the μ-th OFDM symbol. If subcarrier i is a private subcarrier assigned to antenna $\ell$, then $d_{T_x}(n, i, \mu) \neq 0$ only if $n=\ell$. The baseband equivalent of the corresponding transmitted waveform is as follows:

$$x(n, t) = \sum_{\mu=0}^{N_p-1} \sum_{i=0}^{N_s-1} d_{T_x}(n, i, \mu) e^{j2\pi i \Delta t} rect\left(\frac{t - \mu T_p}{T_p}\right), \tag{1}$$

with $rect(t/T_p)$ denoting a rectangular pulse of duration $T_p$, where $T_p$ is the duration of OFDM symbol.

Assume that there are $N_k$ point targets in the far field, each characterized by angle, range and Doppler frequency $\theta_k$, $R_k$, $f_{d_k}$, respectively. It holds that $f_{d_k}=2v_k f_c/c$ with c denoting the speed of light, and $v_k$ representing the velocity of the k-th target. The baseband equivalent of the signal reflected by the targets and received by the m-th antenna is $$y(m, t) = \sum_{k=1}^{N_k} \sum_{n \in \mathcal{N}} x(n, t - \tau_k) e^{j2\pi f_{d_k} t}, \tag{2}$$

for m=0, . . . , $N_r-1$, where $\tau_k$ is the roundtrip delay of the k-th target, with $\tau_k = 2R_k/c + (nd_t + md_r)\sin\theta_k/\lambda_i$, and $\lambda_i = c/(f_c + i\Delta)$ the wavelength of the i-th subcarrier.

Each radar receive antenna samples in time, discards the CP and applies an $N_s$-point discrete Fourier transform (DFT) on the samples to obtain the symbols $$d_{R_x}(m, i, \mu) = \sum_{k=1}^{N_k} \sum_{n \in N} d_{T_x}(n, i, \mu) e^{-j2\pi(md_r + nd_t)sin\theta_k \frac{f_c + i\Delta}{c}} \times e^{-j2\pi i \Delta \frac{2R_k}{c}} e^{j2\pi\mu T_p f_{d_k}}. \tag{3}$$

Eq. (3) can be viewed as $$d_{R_x}(m, i, \mu) = \sum_{k=1}^{N_k} A(k, i, \mu) e^{j\omega(k,i)m}, \quad m = 0, \ldots, N_r - 1 \tag{4}$$

where $$A(k, i, \mu) = \sum_{n \in N} d_{T_x}(n, i, \mu) e^{-j2\pi n d_t sin\theta_k \frac{f_c + i\Delta}{c}} \times e^{-j2\pi i \Delta \frac{2R_k}{c}} e^{j2\pi\mu T_p f_{d_k}} \tag{5}$$

and $$\omega(k, i) = -d_r \sin\theta_k \frac{f_c + i\Delta}{c} \tag{6}$$

Assuming that $N_r > N_k$ and for a fixed i, $\{d_{R_x}(m, i, \mu), m=0, \ldots, N_r-1\}$ can be viewed as a sum of $N_k$ complex sinusoids with frequencies ω(k, i) and magnitudes A(k, i, μ). One can apply any of the existing methods to find the frequencies and amplitudes of the sinusoids. For example, applying an $N_r$-point DFT results in peaks at frequencies ω(k, i). The resolution of the peaks will depend on the number of receive antennas, $N_r$. Once $\omega_k$ are estimated, the target angles can be computed as $$\theta_k = \arcsin\left(-\frac{\omega(k, i)c}{d_r(f_c + i\Delta)}\right) \tag{7}$$

The amplitudes, A(k, i, μ), contain known data symbols and target information, namely, range and Doppler. There can be multiple targets in the same angular bin. Suppose that there are $N_q$ targets at angle $\theta_k$. Then the amplitude can be expressed as $$A(k, i, \mu) = \sum_{n \in N} d_{T_x}(n, i, \mu) e^{-j2\pi n d_t sin\theta_k \frac{f_c + i\Delta}{c}} \times \sum_{q=1}^{N_q} e^{-j2\pi i \Delta \frac{2R_q}{c}} e^{j2\pi\mu T_p f_{d_q}} = A'(k, i, \mu) \sum_{q=1}^{N_q} e^{-j2\pi i \Delta \frac{2R_q}{c}} e^{j2\pi\mu T_p f_{d_q}} \tag{8}$$

where $A'(k, i, \mu) = \sum_{n \in N} d_{T_x}(n, i, \mu) e^{-j2\pi n d_t sin\theta_k \frac{f_c + i\Delta}{c}}$.

Element-wise division results in:

$$d(k, i, \mu)\Delta = \frac{A(k, i, \mu)}{A'(k, i, \mu)} = \sum_{q=1}^{N_q} e^{-j2\pi i \Delta \frac{2R_q}{c}} e^{j2\pi\mu T_p f_{d_q}}. \tag{9}$$

Eq. (9) provides an expression that contains range and Doppler only, while the transmitted data have been eliminated. The range can then be estimated based on the peaks of an $N_s$-point IDFT of d(k, i, μ), taken along the i dimension, i.e., $$r(k,l,\mu)=IDFT[d(k,i,\mu)]=\frac{1}{N_s}\sum_{k=0}^{N_s-1}d(k,i,\mu)e^{j\frac{2\pi}{N_s}il}=\sum_{q=1}^{N_q}\frac{e^{j2\pi\mu T_p f_{d_q}}}{N_s}\sum_{k=0}^{N_s-1}e^{-j2\pi i\Delta\frac{2R_q}{c}}e^{j\frac{2\pi}{N_s}il},\tag{10}$$

for l=0, . . . , $N_s-1$. The peaks of r(m, l, μ) will appear at positions $$l_q=\left\lfloor\frac{2N_sR_q\Delta}{c}\right\rfloor,\tag{11}$$

where ⌊.⌋ denotes the floor function.

Similarly, y performing a discrete Fourier transform on (9) along the dimension μ, results in peaks at $$p_q=\left\lfloor N_pT_pf_{d_q}\right\rfloor=\left\lfloor\frac{2v_qf_cN_pT_p}{c}\right\rfloor,\tag{12}$$

for p=0, 1, . . . , $N_p-1$. Based on the location of those peaks, the targets' velocities may be estimated.

Angle Estimation Via Virtual Array Synthesis

The above presented angle estimation method, via (4)-(7), is based on an array of aperture $(N_r-1)d_r$, and the range and Doppler are coupled with angle. After the angle is estimated and used to obtain a range estimate, it is now possible synthesize a virtual array to refine the angle estimate. Here, it is shown how one can use the private subcarriers and the obtained range estimates to synthesize a virtual array and achieve higher angle resolution. Specifically, a virtual array that has larger aperture than the physical receive array can be formulated based on the private subcarriers, and upon which a sparse signal recovery problem may be formulated to refine the target angle estimation.

The virtual array requires waveform orthogonality. To achieve that, instead of using all subcarrierrs as shared, let us assign a private subcarrier to each antenna, with subcarrier antenna parining $(i_n, n)$. There are $N_x$ private subcarriers at any time, where $N_x<N_s$. Over the private subcarriers waveform orthogonality holds, and at the receiver, the contribution of each transmit antenna can be separated. The symbol received by the m-th antenna on private subcarrier $i_n$ equals:

$$d_{R_x}(m,i_n,\mu)=\sum_{k=1}^{N_k}d_{T_x}(n,i_n,\mu)e^{-j2\pi(nd_t+md_r)sin\theta_k\frac{f_c+i_n\Delta}{c}}\times e^{-j2\pi i_n\Delta\frac{2R_k}{c}}e^{j2\pi\mu T_pfd_k}\tag{13}$$

for m=0, 1, . . . , $N_r-1$ and $n\in\mathcal{N}$. Provided that the spacing between subcarriers is much smaller as compared to $f_c$, then approximate $f_c+i_n\theta\approx f_c$. Then, after the element-wise division with the transmitted symbols, the following is provided:

$$d'(m,i_n,\mu)\triangle=\frac{d_{R_x}(m,i_n,\mu)}{d_{T_x}(n,i_n,\mu)}=\sum_{k=1}^{N_k}e^{-j2\pi(nd_t+md_r)\frac{sin\theta_k}{\lambda_0}}e^{-j2\pi i_n\Delta\frac{2R_k}{c}}e^{j2\pi\mu T_pf_{d_k}}\tag{14}$$

for m=0, 1, . . . , $N_r-1$ and n∈N.

Let $$\alpha_{nk}=e^{-j2\pi nd_t\frac{sin\theta_k}{\lambda_0}}e^{-j2\pi i_n\Delta\frac{2R_k}{c}}\text{ and }\beta_k=e^{j2\pi\mu T_pf_{d_k}}.$$

By stacking d'(m, $i_n$,μ) in vector v, in an order that goes through all possible m's for each $n\in\mathcal{N}$ the following is provided:

$$v=\sum_{k=1}^{N_k}\beta_k[D(R_k)\odot a_t(\theta_k)]\otimes a_r(\theta_k)\tag{15}$$

where ⊗ is the Kronecker product, ⊙ is the Hadamard product, $\alpha t(\theta)=[1,e^{-j2\pi d_t sin\ \theta/\lambda},\ldots,e^{-j2\pi(N_t-1))d_t sin\ \theta/\lambda}]^T$ and $\alpha r(\theta)=[1,e^{-j2\pi d_r sin\ \theta/\lambda},\ldots,e^{-j2\pi(N_r-1))d_r sin\ \theta/\lambda}]^T$ are the transmit and receive steering vector, respectively, and $$D(R)=I_{\mathcal{N}}\left[e^{-j2\pi i_0\Delta\frac{2R}{c}},e^{-j2\pi i_1\Delta\frac{2R}{c}},\ldots,e^{-j2\pi i_{N_t-1}\Delta\frac{2R}{c}}\right]^T\tag{16}$$

where $I_{\mathcal{N}}$ is a diagonal matrix whose n-th diagonal element is 1 if $n\in\mathcal{N}$, otherwise it is 0.

Eq. (15) corresponds to a sparse ULA with aperture $(N_t-1)d_t+(N_r-1)d_r$, based on which, the targets parameters can be estimated via sparse signal recovery methods [9].

Let $R_1, R_2, \ldots, R_{N_k}$ be the already estimated target ranges. By discretizing the angle space on a grid of size $N_a$, i.e., $\{\tilde{\theta}(1),\ldots,\tilde{\theta}(N_a)\}$, Eq. (15) can be expressed as $$v=\left[v_{11},v_{12},\ldots,v_{N_a\times N_k}\right]\begin{bmatrix}\tilde{\beta}_{11}\\ \vdots\\ \tilde{\beta}_{N_a\times N_k}\end{bmatrix}=\left[v_{11},v_{12},\ldots,v_{N_a\times N_k}\right]\tilde{\beta}\tag{17}$$

where $\tilde{\beta}_{ij}$ is non zero if there is a target at range $R_j$ and angle $\theta_i$ and $$v_{ij}=[D(R_j)\odot a_t(\theta_i)]\otimes a_r(\theta_i)\tag{18}$$

is the dictionary element for i=1,2, . . . , $N_a$ and j=1, 2, . . . , $N_k$. The sparse vector $\tilde{\beta}$ can be estimated via $L_1$ norm minimization, and its support will provide target angle estimates.

Radar System Summary

With respect to the radar system described above and herein, angle estimation may be summarized as follows:

$N_k$ targets (angle, range, Doppler frequency):$(\theta_k, R_k, f_{d_k})$

The baseband received waveforms:

$$y(m, t) = \sum_{k=1}^{N_k} \sum_{n \in N} x(n, t - \tau_k) e^{j2\pi f_{d_k} t} \tag{S1}$$

After $N_s$-point DFT, the modulated received symbols are:

$$d_{R_x}(m, i, \mu) = \sum_{k=1}^{N_k} \sum_{n \in N} d_{T_x}(n, i, \mu) e^{-j2\pi(mred_r + nd_t)redsin\theta_k \frac{f_c + i\Delta}{c}} \times e^{-j2\pi i\Delta \frac{2R_k}{c}} e^{j2\pi\mu T_p f_{d_k}} \tag{S2}$$

$$= \sum_{k=1}^{N_k} A(k, i, \mu) e^{jred\omega(k,i)m} \tag{S3}$$

Sum of complex exponentials with frequencies ω(k, i) and amplitudes A(k, i, μ). ω(k;i)→$\theta_k$ With respect to the radar system described above and herein, range and doppler estimation may be summarized as follows:

$N_q$ targets at $\theta_k$:

$$A(k, i, \mu) = \sum_{n \in N} d_{T_x}(n, i, \mu) e^{-j2\pi nd_t sin\theta_k \frac{f_c + i\Delta}{c}} \sum_{q=1}^{N_q} e^{-j2\pi i\Delta \frac{2R_q}{c}} e^{j2\pi\mu T_p f_{d_q}} = A'(k, i, \mu) \sum_{q=1}^{N_q} e^{-j2\pi i\Delta \frac{2R_q}{c}} e^{j2\pi\mu T_p f_{d_q}} \tag{S4}$$

$$\frac{A(k, i, \mu)}{A'(k, i, \mu)} = \sum_{q=1}^{N_q} e^{-j2\pi iblue\Delta \frac{2R_q}{c}} e^{j2\pi\mu brownT_p f_{d_q}} \tag{S5}$$

$N_s$-pt IDFT along i→peaks at $$\left\lfloor \frac{2N_s R_q \Delta}{c} \right\rfloor \to \text{Range}$$

$N_p$-pt DFT along μ→peaks at $\lfloor N_p T_p f_{d_q} \rfloor$→Doppler

With respect to the radar system described above and herein, the virtual array may be summarized as follows:

Assign $N_x < N_s$ private subcarriers to active antennas (antenna n with subcarrier $i_n$)→orthogonality holds over private subcarriers.

Taking $f_c + i_n\Delta \approx f_c$ and after element-wise division on data symbols provides that:

$$d(m, i_n, \mu) = \sum_{k=1}^{N_k} e^{-j2\pi(nd_t + md_r)\frac{sin\theta_k}{\lambda}} e^{-j2\pi i_n\Delta \frac{2R_k}{c}} e^{j2\pi\mu T_p f_{d_k}} \tag{S6}$$

Based on all values of $i_n$ and m provides that:

$$d = \sum_{k=1}^{N_k} \beta_k [D(R_k) \odot a_t(\theta_k)] \otimes a_r(\theta_k) \text{ virtual array! where} \tag{S7}$$

$$D(R) = I_N \left[ e^{-j2\pi i_0 \Delta \frac{2R}{c}}, e^{-j2\pi i_1 \Delta \frac{2R}{c}}, \ldots, e^{-j2\pi i_{N_t - 1} \Delta \frac{2R}{c}} \right]^T \text{ and}$$

$$\beta_k = e^{j2\pi\mu T_p f_{d_k}}.$$

With respect to the radar system described above and herein, angle estimation and virtual array may be summarized as follows:

Discretizing the angle space on a grid of size N, i.e., $\{\tilde{\theta}(1), \ldots, \tilde{\theta}(N)\}$, and considering the range space $\{R_1, \ldots, R_{N_k}\}$ eq. (7) can be expressed as:

$$d = \sum_{k=1}^{n_k} \sum_{\ell=1}^{N} \tilde{\beta}_{k\ell} \left[ D(R_k) \odot a_t(\tilde{\theta}_\ell) \right] \otimes a_r(\tilde{\theta}_\ell) \text{ where} \tag{S8}$$

$$\tilde{\beta}_{k\ell} = \begin{cases} \neq 0 & \text{if there is a target at } (R_k, \tilde{\theta}_\ell) \\ 0 & \text{otherwise} \end{cases}$$

This is a sparse signal recovery (SSR) problem.

Find the angles by estimating $\tilde{\beta}_{k\ell}$

Communication System

In order to implement GSM, only $N_x$ out of the $N_t$ ($N_x << N_t$) antennas will be active during a given transmission period. The indices of those antennas will change between transmission periods, and will be used to encode information. There are in total $$C = \binom{N_t}{N_x}$$

different active antenna selection possibilities. In each symbol period, those combinations will result in transmitted information bits as follows:

$$B = \lfloor \log_2(C) \rfloor \tag{19}$$

The active antenna indices along with the transmitted data symbols can be estimated at the communication receiver as follows. Consider a communication receiver with $N_c$ antennas. The received symbol matrix corresponding to the μ-th OFDM symbol equals:

$$Y = \begin{bmatrix} d_{C_x}(0, 0, \mu) & \ldots & d_{C_x}(0, N_s - 1, \mu) \\ d_{C_x}(1, 0, \mu) & \ldots & d_{C_x}(1 - N_s - 1, \mu) \\ \ldots & \ldots & \ldots \\ d_{C_x}(N_c - 1, 0, \mu) & \ldots & d_{C_x}(N_c - 1, N_s - 1, \mu) \end{bmatrix} \tag{20}$$

where $d_{C_x}(m, i, \mu)$ refers to the complex symbol received by the m-th communication receive antenna on the i-th subcarrier. As a result of subcarrier sharing and the narrow bandwidth of the OFDM subcarriers, the i-th column of Y can be expressed as $$Y_i = H_i A_i + N, i = 0, \ldots, N_s - 1 \tag{21}$$

where $H_i \in \mathbb{C}^{N_c \times N_t}$ is the frequency response of the channel between the transmit and receive antennas along the i-th carrier;

$A_i = \mathbf{I}_{\mathcal{N}} [d_{T_x}(1,i,\mu), d_{T_x}(2,i,\mu), \ldots, d_{T_x}(N_t,i,\mu)]^T$ containing the data symbols transmitted on the i-th subcarrier; and $N \in \mathbb{C}^{N_c}$ is additive white Gaussian noise.

Information Recovery Via Sparse Signal Recovery Methods

When only a small fraction of the radar transmit antennas is active at a time, $A_i$ will be sparse. For a given μ, all $A_i$'s for $i=0, \ldots, N_s-1$ have the same sparsity pattern. Then, under certain conditions, $A_i$ can be recovered by solving a sparse signal recovery problem. By applying the same process to every subcarrier and every OFDM symbol, all transmitted symbols can be recovered. The support of the recovered $A_i$ provides the active antenna indices. By decoding those indices the transmitted bits in one period can be increased by B.

Compared with an OFDM communication system with the same modulation scheme but without subcarrier sharing, the proposed scheme increases the number of information bits transmitted in one period by a factor of $N_x$ at maximum.

Information Recovery by Exploiting the Private Subcarriers

An alternative way to estimate the transmitted symbols is achieved by exploiting the private subcarriers.

The communication receiver does not know which subcarriers are private. However, if after applying sparse signal recovery on a certain subcarrier the recovered sparse vector contains only one nonzero element, then the receiver may conclude that that subcarrier was private and the non-zero symbol location corresponds to the index of the active antenna matched to that subcarrier. In that way, the receiver can identify all private subcarriers and active antenna indices. Subsequently, the receiver can estimate the transmitted symbols on the shared subcarriers via least-squares estimation. As will be shown in the simulations section below, this approach is more robust than estimating the symbols via the methods discussed above.

Communication System Summary

With respect to the communication system described above and herein, the use OFDM data symbols may be summarized as:

Number of active antennas: $N_x \rightarrow N_x < N_C < N_r$

The received symbols over the subcarrier i:

$$y_i = H_i A_i + N \tag{S9}$$

$H_i \in$ $C^{N_{C_r} \times N_t}$, is the channel frequency response along the i-th subcarrier, and $a_i$ contains the transmitted symbols of all antennas over carrier i.

- Since only a small number of antennas are active, $A_i$ is sparse, and the symbols can be estimated via SSR methods.
- Alternatively, first use (S9) and SSR to identify the private subcarriers (they contain one data symbol only), which will reveal the active antenna indices. Then, obtain the data symbols of the active antennas via least-squares techniques.

With respect to the communication system described above and herein, the use of GSM may be summarized as:

$$C = \binom{N_t}{N_x}$$

antennas activation patterns.

- $(N_s-N_x+1)N_x$ data symbols plus $\lfloor \log_2(C) \rfloor$) position bits are communicated.
- Use different reordering of private subcarriers to increasing position bits to $\lfloor \log_2(C \cdot N_x!) \rfloor$
- In addition to conveying information, the sparse transmit array reduces complexity of the transmit array (fewer RF chains), and also the communication receive array (fewer antennas).

Dual-Function System

This section discusses how the radar and communication components of the system are implemented.

Radar Transmitter:

The bit stream is divided into multiple sections, each section containing the symbols to be assigned to each antenna, i.e., the symbols comprising the OFDM symbol to be transmitted by the antenna. Each section is preceded by B bits, indicating the indices of antennas to be active. The indices of active antennas change between channel uses.

There are $N_s$ subcarriers. The binary source symbols are divided into groups of $N_s$ symbols and each group is assigned to an active antenna. The symbols of each antenna are modulated and distributed on all subcarriers.

If virtual array is used for improved angle resolution, each active antenna is paired with a private subcarrier. As generally discussed herein, it is assumed that there are $N_x$ active antennas and thus $N_x$ private subcarriers. However, it is not necessary for every active antenna to be assigned a private subcarrier; there could be any number of private subcarriers from 0 up to $N_x$. For simplicity, we here assume that $N_x$ private subcarriers are used.

The binary source symbols are divided into groups of $N_s-N_x+1$ symbols and each group is passed to an active antenna. The symbols of each antenna are modulated and distributed on all subcarriers except those that are private to other antennas. Each antenna places a zero on the private subcarrier of other antennas. The symbols of each antenna undergo OFDM modulation based on $N_s$ subcarriers and are transmitted.

Radar Receiver:

The angles are estimated by first performing an $N_r$-point DFT on (4) along the m dimension. The location of the peaks are the frequencies of (6), which then lead to the target angles via (7). Subsequently, the target ranges are estimated based on (11), and the velocities based on (12). To maintain full range resolution, in each OFDM symbol, the full bandwidth should be used to carry symbols. Similarly, to maximize the Doppler resolution, at least one subcarrier should be modulated with data symbols in all OFDM symbols, since the Doppler resolution is determined by the total time of observation on the subcarrier.

Using the Virtual Array:

The angle estimates can be refined using the various methods discussed above, which methods may be iteratively used to improve the estimation of range and Doppler. The latter can be done evaluating (9) with the refined frequency estimates and then repeating the range-Doppler estimation. For the sake of achieving a virtual array with maximum aperture, the first and last active antennas need to be fixed, which slightly reduces the number of antenna activation patterns.

About the Private Subcarriers:

The use of private subcarriers comes at the cost of limiting the spatial encoding and losing $N_x(N_x-1)$ data symbols. In order to reduce the loss, and if the target is not changing fast over M OFDM symbols ($M<N_p$), then use private subcarriers only once every M OFDM symbols. In most scenarios this is a reasonable assumption. For example, for an OFDM system with subcarrier bandwidth 100 kHz, the OFDM symbol duration is 10 μs. For an array with 1 degree angle resolution, for a target at 50 m to move out of the angle bin it would require speed of $$\frac{8.73}{M} \times 10^4 \text{ m/s};$$

this means that the target will stay in the same angle bin for several OFDM symbols.

Information Required:

In the proposed DFRC system, the communication receiver needs to know the channel matrix H, the number of subcarriers and the length of CP. Synchronization at symbol level is also assumed.

FIG. 3 depicts a flow diagram of a method according to an embodiment. The method 300 of FIG. 3 depicts processing steps at a radar transmitter and a radar receiver of a DFRC in accordance with various embodiments.

As previously discussed, each bitstream to be transmitted (i.e., received output bitstream) is divided into multiple sections, each section containing the symbols to be assigned to a respective active antenna (i.e., the symbols comprising the OFDM symbols to be transmitted by the assigned active antenna). Each section is preceded by B bits, indicating the indices of antennas to be active. The indices of active antennas typically change between channel uses, and a multi-antenna communication receiver may identify the changed indices of active antennas via sparse signal recovery methods.

It is noted that each channel use iteration is directed to transmitting currently processed symbol-bearing sections associated with a received output bitstreams. As additional data is provided by the received output bitstreams, the additional data is divided and otherwise processed as indicated herein to provide additional or subsequent symbol-bearing sections for transmission via respective active antennas in a subsequent channel use iteration.

At step 310, at a radar transmitter of a DFRC, the following steps are performed for each channel use iteration:

- Identify antennas to be active during the channel use iteration. As depicted above with respect to FIG. 1, the specific antennas to be active during each channel use may be indicated via an activation code provided via the input signal path, a control path, or some other mechanism.
- Pair each active antenna with a private subcarrier which is exclusive to its use. As discussed above, the private subcarriers may be used to synthesize a virtual array for high angular resolution, and also for improved estimation on the active antenna indices. For example, assuming Nx active antennas and Nx private subcarriers, the binary source symbols are divided into groups of Ns−Nx+1 symbols, and each group is passed to a respective active antenna such that the symbols of each antenna are modulated and distributed on all subcarriers except those that are private to other antennas.
- Perform OFDM modulation based on subcarriers on the symbols of each active antenna.
- Convert the modulated subcarriers into analog signals.
- Upconvert each analog signal in accordance with a carrier frequency for transmission by the assigned antenna.

At step 320, at a radar receiver of the DFRC, the following steps are performed for each sequence of antenna samples received in time via a respective antenna (after identifying indices of active antennas such as via sparse signal recovery methods):

- Downconvert reflected OFDM signals to retrieve respective samples.
- Discard the CP from the received samples and apply an Ns-point discrete Fourier transform (DFT) to the samples to obtain the respective symbols.
- Estimate target elevation angle(s) based on the location of the peaks of an Nr-point DFT performed along the receiving array, and compute the amplitudes corresponding to each peak (denoted herein as frequency amplitudes). See also FIG. 4 and related discussion.
- Optionally, based on the private subcarriers, formulate a virtual array having a larger aperture than the physical receive array (e.g., a ULA receive array as previously discussed), and use the virtual array with sparse signal recovery to refine the target elevation angle estimates.
- Estimate target range(s). For each estimated angle, obtain the range parameters based on the frequency amplitudes along all subcarriers, and knowledge of the transmitted symbols (e.g., symbol type, transmit/receive matrix, antenna assignment, etc.). The estimated target range(s) are found as the location of peaks of cross-correlations of Ns-point DFTs (the peaks amplitudes may be denoted as range amplitudes).
- For each target range estimate, estimate the Doppler/velocity parameters based on the location of the peaks of an Np-point DFT of the range amplitudes across Np OFDM symbols.

FIG. 4 graphically depicts an angle and range estimation mechanism according to an embodiment and suitable for use in the method 300 of FIG. 3. Referring to FIG. 4, it can be seen by inspection that a received symbol matrix is formed by a columnar representation of the Ns subcarriers, as conveyed via the Nr receive antennas where each receive antenna Nr (row) is associated with a plurality (Ns) of subcarriers of symbol-representative samples.

As depicted in FIG. 4, a course angle discrete Fourier transform (DFT) is applied to the symbol-representative samples of each individual subcarrier Ns to derive thereby angle profile information, such at the information peaks depicted as $\theta_1$, $\theta_2$, and $\theta_3$. Similarly, cross-correlation based range estimation is applied to the symbol-representative samples of each of the individual $N_r$ receive antennas to derive thereby range profile information, such as the information peaks depicted as $R_1$, $R_2$, and $R_3$. It is noted that information peaks other than those depicted (i.e., $\theta_1$, $\theta_2$, $\theta_3$, $R_1$, $R_2$, and $R_3$) that are likely to exist have been omitted from FIG. 4 for simplicity of this discussion). Cross-correlation is used to address a potential zero denominator condition.

Referring to FIG. 4, it can be seen that the angle DFT is along the received antennas Nr, and for each DFT peak (e.g., $\theta_1$, $\theta_2$, and $\theta_3$) a cross-correlation between the transmitted symbols (e.g., from a similar transmitted symbols matrix—not shown) and the modulated symbols (e.g., from the received symbol matrix) is applied. It is noted that the receiver and transmitter are collocated on the same platform, and the transmitted symbols matrix is provided to the receiver via that platform (e.g., from the transmitter processing stage to the transmitter processing stage, such as depicted and described above with respect to FIG. 1). That is, the transmitter method (how target parameters are estimated) and the receiver method may work together.

Simulation Results

This section demonstrates via simulations the radar target detection and communication performance of the proposed DFRC system.

The channels are simulated to be frequency selective and the corresponding impulse responses are complex with zero-mean jointly Gaussian real and imaginary parts. The system parameters are shown in Table 1. The antennas transmit 16-QAM signals in an OFDM fashion. Several point targets in the far field of the array are considered, each characterized by (angle, range, velocity), with values as shown in Table 2.

Based on Table 2, two of the targets have the same relative velocity of 5 m/s and are closely placed, i.e., have polar coordinates (19.50 m) and (22.50 m). In order to construct a virtual array, the first Nx subcarriers are set as private.

TABLE 1

RADAR PARAMETERS

| Parameter | Symbol | Value |
|---|---|---|
| Center frequency | $f_c$ | 24 GHz |
| Subcarrier spacing | $\Delta$ | 100 kHz |
| Cyclic prefix length | $T_c$ | 2.5 μs |
| Duration of OFDM symbol | $T_p$ | 12.5 μs |
| Number of subcarriers | $N_s$ | 1024 |
| Number of OFDM symbols | $N_p$ | 256 |
| Total number of transmit antennas | $N_t$ | 32 |
| Number of activated antennas | $N_x$ | 5 |
| Number of radar receive antennas | $N_r$ | 50 |
| Number of communication receive antennas | $N_c$ | 16 |
| Receive antenna spacing distance | $d_r$ | 0.5λ |
| Transmit antenna spacing distance | $d_t$ | 1λ |

TABLE 2

RADAR PARAMETERS

| Target parameters | Estimated parameters |
|---|---|
| (19, 50 m, 5 m/s) | (19, 49.80 m, 5.86 m/s) |
| (7, 45 m, 10 m/s) | (7, 45.41 m, 9.77 m/s) |
| (19, 80 m, 7 m/s) | (19, 80.57 m, 7.81 m/s) |
| (22, 50 m, 5 m/s) | (22, 49.80 m, 5.86 m/s) |

The radar first estimates the target angles via the low-resolution method (eqs. (4)-(7)), and then estimates the target ranges corresponding to each angle, based on Eq. (11). The obtained estimates are (6.89, 45.41 m,9.77 m/s), (18.66, 49.80m,5.86 m/s) and (18.66,80.57 m, 7.81 m/s), where one can see that one target has not been resolved. Based on the estimated target ranges, a high-resolution angle estimate is obtained based on the virtual array. The obtained parameters are given in Table 2, where one can see that the closely spaced targets have been resolved.

Figure 5:
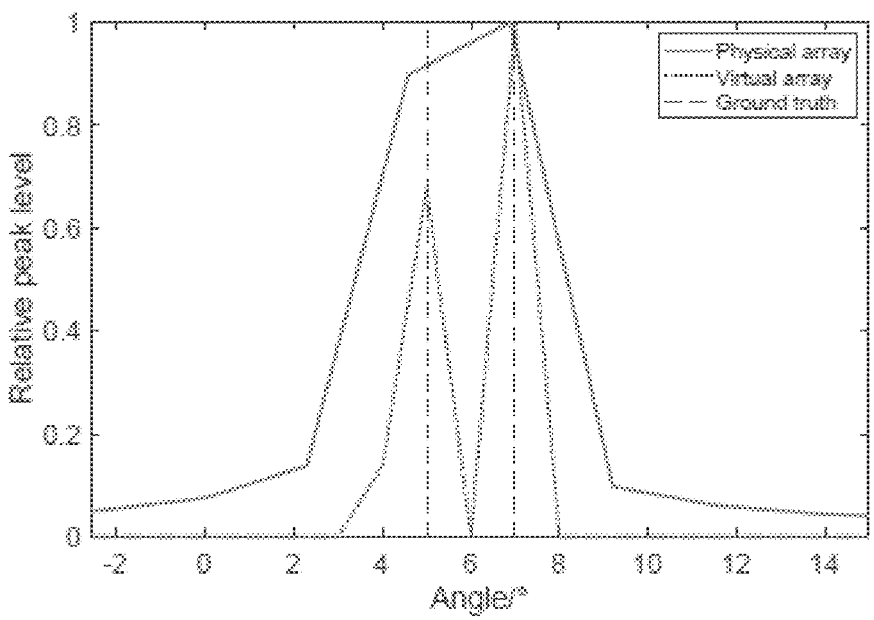
FIG. 5 graphically depicts relative peak level as a function of angle/$^{\circ 0}$ based on data symbols obtained via sparse signal recovery in accordance with some of the embodiments.

FIG. 5 graphically depicts relative peak level as a function of angle/° based on data symbols obtained via sparse signal recovery, and demonstrates the improvement in angular resolution enabled by the virtual array. In this case there are two targets, at 5 and 7 angles and both at the same range. The red line shows the magnitude DFT of $\{d_{R_x}(m, i, \mu), m=0, \ldots, N_r-1\}$, with the location of the peaks indicating the angle estimates. The aperture of the receive array, i.e., $(N_r-1)d_r=24.5\lambda$, does not allow for the estimation of closely placed targets and thus only one peak shows up. The blue line shows the magnitude of $\tilde{\beta}$ of (17), with the peaks indicating the high resolution angle estimates. The virtual array is a sparse version of an array of aperture $(N_t-1)d_t+(N_r-1)d_r=55.5\lambda$, thus, due to its higher resolution the targets can be resolved. For the virtual array based estimate, a grid of size $N_a=181$ was used. In this simulation, no noise was added.

Figure 6:
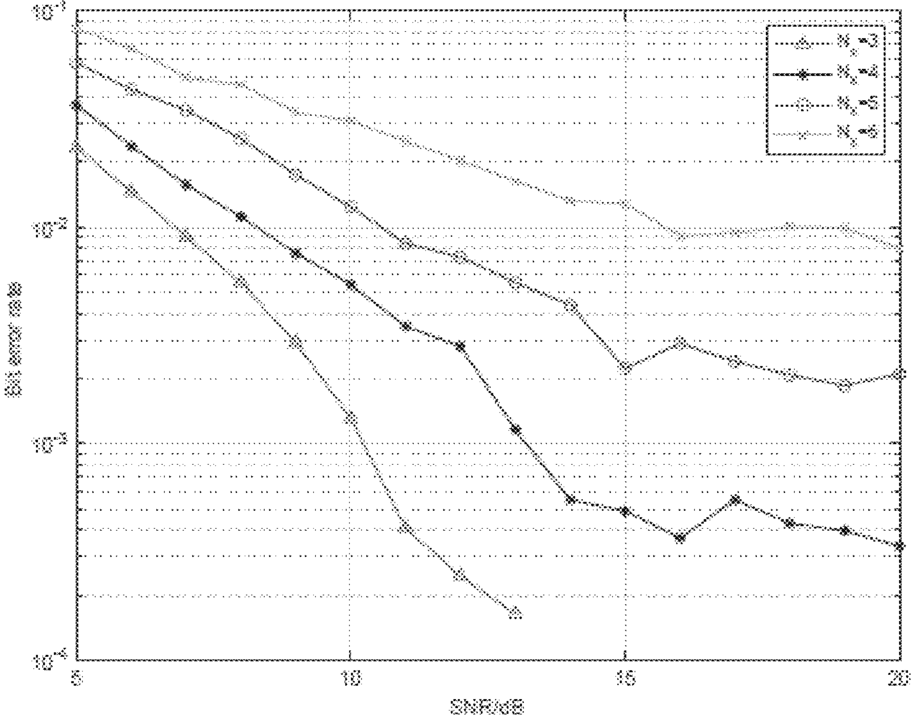
FIG. 6 graphically depicts bit error rate (BER) as a function of SNR/dB on data symbols obtained via sparse signal recovery in accordance with some of the embodiments.

To evaluate the performance of the communication functionality Monte Carlo simulations were performed and calculated the bit error rates from data symbols and antenna indices encoding under different SNRs and different numbers of active antennas. FIG. 6 graphically depicts bit error rate (BER) as a function of SNR/dB on data symbols obtained via sparse signal recovery. and illustrates the performance of the communication system when applying the data symbol recovery method presented above. For a fixed SNR, the fewer the activated antennas the smaller the BER is. This is because sparse signal recovery works better when the signal is sparser.

Figure 7:
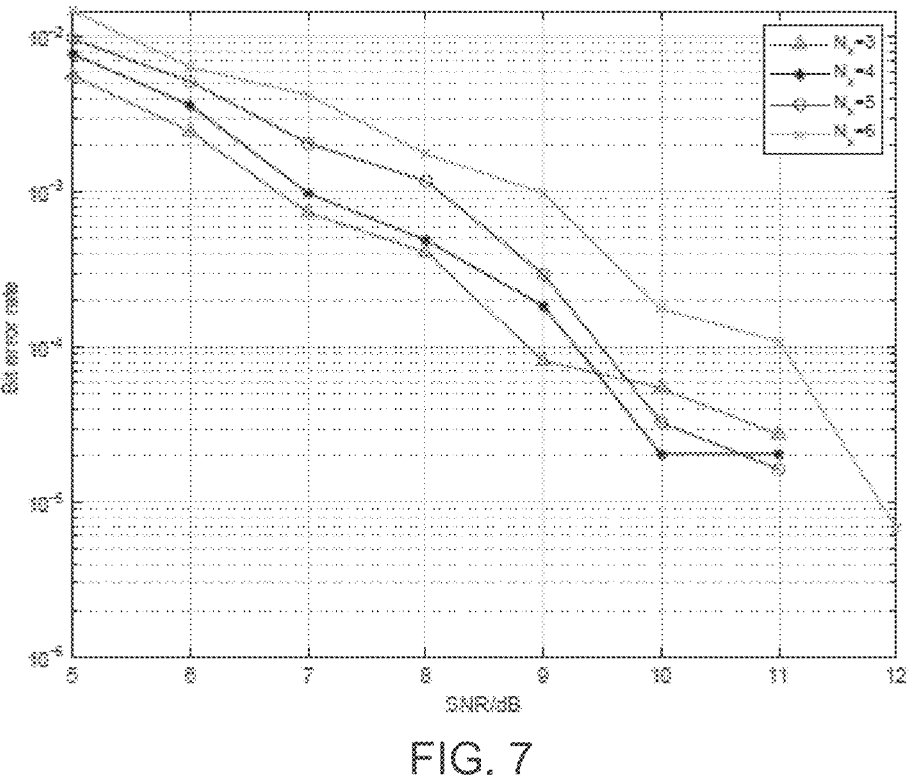
FIG. 7 graphically depicts BER as a function of SNR for data symbols obtained via some of the embodiments.

FIG. 7 graphically depicts BER as a function of SNR for data symbols received or obtained via the above methods. Specifically, FIG. 7 depicts a plot of BER based on the received symbols, when the communication receiver applies the symbol and active antenna indices recovery method described above; that is, the private subcarriers and active antennas indices are identified first, and then the symbols are recovered via an LS approach. In comparison to FIG. 6, one can see that this approach achieves lower BER for the same SNR and the same value of $N_x$. Indeed, the use of private subcarriers not only enables the construction of a virtual array for the radar system, but it also makes the communication system more robust to noise.

Figure 8:
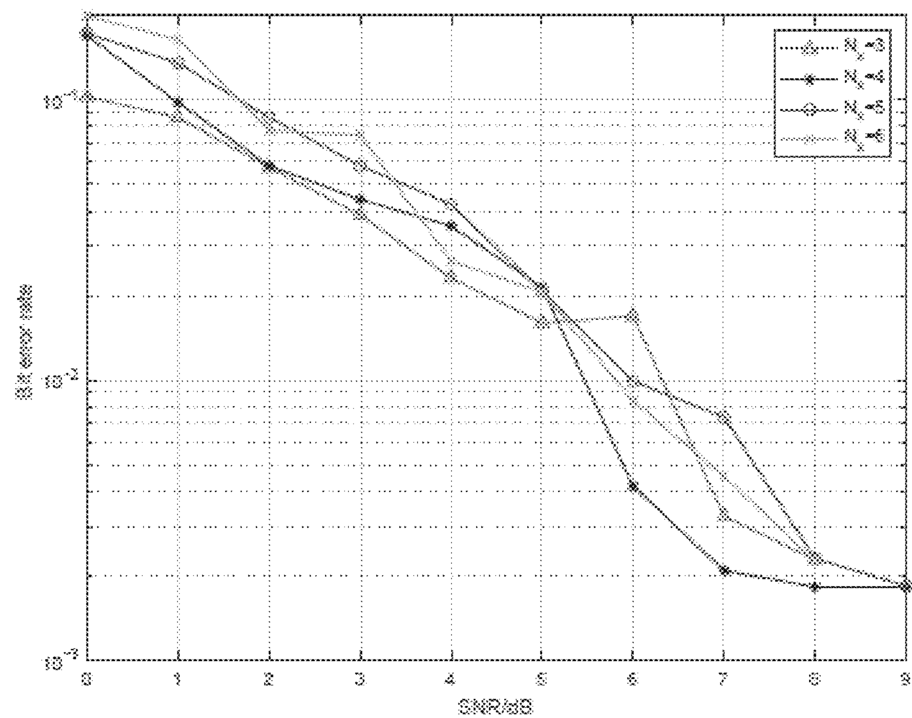
FIG. 8 graphically depicts BER as a function of SNR for GSM data symbols obtained via some of the embodiments.

FIG. 8 graphically depicts BER as a function of SNR for GSM data symbols received or obtained via the above methods, showing thereby the BER corresponding to the estimated antenna indices. In the simulations, the position bit stream was randomly generated and mapped to a dictionary to decide the indices of active antennas. One can see that the position encoding is robust to noise and the number of active antennas does not affect the result as in FIG. 6.

Under the configuration provided in the table, the maximum bit rate of the system with no private subcarriers is 1.6398 Gigabits per second, while the maximum bit rate of the same system with $N_x=5$ private subcarriers in every OFDM symbol is 1.6339 Gigabits per second. Thus, while the loss in bit rate from enabling private subcarrier is minor, the improvement in BER is significant.

CONCLUSION

Described herein is a novel MIMO-OFDM dual-function system using a sparse transmit array, whose active elements are selected in a GSM fashion. Most subcarriers are used in a shared fashion by the active antennas, except a set of subcarriers that are assigned to the transmit antennas in an exclusive fashion (private subcarriers). For the radar function, the system estimates angle, range and Doppler information using both private and shared subcarriers. The angle estimate is further improved by exploiting a virtual array constructed based on the private subcarriers. The communication system can use the private subcarriers to estimate active antenna indices and thus decode spatial information. Subcarrier sharing allows for high communication rates. The fact that only a small number of transmit antennas is active allows for low hardware cost of the DFRC system.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A multiple-input multiple-output (MIMO) radar system, comprising:

a uniform linear array (ULA) transmit array having $N_t$ active transmit elements, spaced apart by $d_t$; and a transmitter processing stage, configured for transmitting Ns symbol-bearing sections via a plurality of active antennas, the transmitter processing stage:

identifying antennas to be active during the channel use iteration, each of the active antennas being associated with each of a first group of subcarriers to be used as shared subcarriers and a respective one private subcarrier;

performing OFDM modulation based on Ns shared subcarriers and one respective private subcarrier on the symbols of each active antenna, wherein the private subcarrier associated with a respective active antenna includes a non-zero symbol only at a symbol location corresponding to an index of the respective active antenna to enable thereby active transmit antenna identification at a receiver using sparse signal recovery;

converting the modulated subcarriers into analog signals; and upconverting each analog signal in accordance with a carrier frequency for transmission by a respective assigned active antenna.

2. The multiple-input multiple-output (MIMO) radar system of claim 1, wherein for each channel use iteration an activation code is provided to indicate the active antennas for the channel use iteration.

3. The multiple-input multiple-output (MIMO) radar system of claim 1, wherein the transmitter processing stage comprises a plurality of quadrature amplitude modulation (QAM) modulators configured to generate respective modulated data symbols sequences in response to respective received output data stream sections.

4. The multiple-input multiple-output (MIMO) radar system of claim 3, wherein the transmitter processing stage comprises:

a plurality of serial to parallel (S/P) converters configured to convert respective serial input data streams into output data stream sections for use by respective QAM modulators; and a plurality of parallel to serial (P/S) converters configured to convert respective IDFT/CP processed modulated data symbols sequences to serial data symbol streams; and a plurality of analog to digital (A/D) converters to convert respective serial data symbol streams into respective analog transmission signals (TX).

5. The multiple-input multiple-output (MIMO) radar system of claim 1, further comprising:

a ULA receive array with $N_r$ active receive elements, spaced apart by $d_t$; and a receiver processing stage, configured for:

downconverting reflected subcarrier signals to retrieve respective samples, discard a cyclic prefix (CP) from the received samples;

applying an Ns-point discrete Fourier transform (DFT) to the received samples to obtain respective symbols;

estimating target elevation angles based on location of peaks of an Nr-point DFT performed along a receiving array, each Nr-point DFT peak having associated with it a corresponding frequency amplitude;

for each estimated target elevation angle, obtaining a range parameter based on the frequency amplitudes along all subcarriers;

estimating target ranges based on location of peaks of cross-correlations of Ns-point DFTs, each Ns-point DFT peak having associated with it a corresponding range amplitude; and for each target range estimate, estimating a velocity parameter based on location of peaks of an Np-point DFT of the range amplitudes across Np OFDM symbols.

6. The multiple-input multiple-output (MIMO) radar system of claim 5, wherein the receiver processing stage is further configured for:

formulating a virtual array having a larger aperture than the ULA receive array; and using the virtual array and sparse signal recovery to refine the target elevation angle estimates.

7. The multiple-input multiple-output (MIMO) radar system of claim 5, wherein the receiver processing stage is further configured for:

applying sparse signal recovery on at least some of the received subcarriers to determine if a received subcarrier contains only one nonzero element, wherein each received subcarrier containing only one nonzero element comprises a private subcarrier associated with a respective transmitting antenna, the symbol location of the nonzero element being indicative of the respective transmitting antenna.

8. A method for use by a multiple-input multiple-output (MIMO) radar system including a uniform linear array (ULA) transmit array having $N_t$ active transmit elements, spaced apart by $d_t$ and configured for transmitting Ns symbol-bearing sections via a plurality of active antennas, the method comprising:

identifying antennas to be active during the channel use iteration, each of the active antennas being associated with each of a first group of subcarriers to be used as shared subcarriers and a respective one private subcarrier;

performing OFDM modulation based on Ns shared subcarriers and respective one private subcarrier on the symbols of each active antenna, wherein the private subcarrier associated with a respective active antenna includes a non-zero symbol only at a symbol location corresponding to an index of the respective active antenna to enable thereby active transmit antenna identification at a receiver using sparse signal recovery;

converting the modulated subcarriers into analog signals; and upconverting each analog signal in accordance with a carrier frequency for transmission by a respective assigned active antenna.

9. The method of claim 8, wherein for each channel use iteration an activation code is provided to indicate the active antennas for the channel use iteration.

10. The method of claim 8, wherein a plurality of quadrature amplitude modulation (QAM) modulators are configured to generate respective modulated data symbols sequences in response to respective received output data stream sections.

11. The method of claim 8, wherein:

a plurality of serial to parallel (S/P) converters are configured to convert respective serial input data streams into output data stream sections for use by respective QAM modulators; and a plurality of parallel to serial (P/S) converters are configured to convert respective IDFT/CP processed modulated data symbols sequences to serial data symbol streams; and a plurality of analog to digital (A/D) are converters to convert respective serial data symbol streams into respective analog transmission signals (TX).

12. The method of claim 8, wherein the MIMO radar system further includes a ULA receive array with $N_r$ active receive elements spaced apart by $d_r$, the method further comprising:

downconverting reflected subcarrier signals to retrieve respective samples;

discarding a cyclic prefix (CP) from the received samples;

applying an Ns-point discrete Fourier transform (DFT) to the received samples to obtain respective symbols;

estimating target elevation angles based on location of peaks of an Nr-point DFT performed along a receiving array, each Nr-point DFT peak having associated with it a corresponding frequency amplitude;

for each estimated target elevation angle, obtaining a range parameter based on the frequency amplitudes along all subcarriers;

estimating target ranges based on location of peaks of cross-correlations of Ns-point DFTs, each Ns-point DFT peak having associated with it a corresponding range amplitude; and for each target range estimate, estimating a velocity parameter based on location of peaks of an Np-point DFT of the range amplitudes across Np OFDM symbols.

13. The method of claim 12, further comprising:

applying sparse signal recovery on at least some of the received subcarriers to determine if a received subcarrier contains only one nonzero element, wherein each received subcarrier containing only one nonzero element comprises a private subcarrier associated with a respective transmitting antenna, the symbol location of the nonzero element being indicative of the respective transmitting antenna.

14. An apparatus, comprising:

a uniform linear array (ULA) transmit array having $N_t$ active transmit elements, spaced apart by $d_t$; and a transmitter processing stage, configured for transmitting Ns symbol-bearing sections via a plurality of active antennas, the transmitter processing stage:

identifying antennas to be active during the channel use iteration, each of the active antennas being associated with each of a first group of subcarriers to be used as shared subcarriers and a respective one private subcarrier;

performing OFDM modulation based on Ns shared subcarriers and respective one private subcarrier on the symbols of each active antenna, wherein the private subcarrier associated with a respective active antenna includes a non-zero symbol only at a symbol location corresponding to an index of the respective active antenna to enable thereby active transmit antenna identification at a receiver using sparse signal recovery;

converting the modulated subcarriers into analog signals; and upconverting each analog signal in accordance with a carrier frequency for transmission by a respective assigned active antenna.

15. The apparatus of claim 14, wherein for each channel use iteration an activation code is provided to indicate the active antennas for the channel use iteration.

16. The apparatus of claim 14, wherein the transmitter processing stage comprises a plurality of quadrature amplitude modulation (QAM) modulators configured to generate respective modulated data symbols sequences in response to respective received output data stream sections.

17. The apparatus of claim 16, wherein the transmitter processing stage comprises:

a plurality of serial to parallel (S/P) converters configured to convert respective serial input data streams into output data stream sections for use by respective QAM modulators; and a plurality of parallel to serial (P/S) converters configured to convert respective IDFT/CP processed modulated data symbols sequences to serial data symbol streams; and a plurality of analog to digital (A/D) converters to convert respective serial data symbol streams into respective analog transmission signals (TX).

18. The apparatus of claim 14, further comprising:

a ULA receive array with $N_r$ active receive elements, spaced apart by $d_r$; and a receiver processing stage, configured for:

downconverting reflected subcarrier signals to retrieve respective samples;

discard a cyclic prefix (CP) from the received samples;

applying an Ns-point discrete Fourier transform (DFT) to the received samples to obtain respective symbols;

estimating target elevation angles based on location of peaks of an Nr-point DFT performed along a receiving array, each Nr-point DFT peak having associated with it a corresponding frequency amplitude;

for each estimated target elevation angle, obtaining a range parameter based on the frequency amplitudes along all subcarriers;

estimating target ranges based on location of peaks of cross-correlations of Ns-point DFTs, each Ns-point DFT peak having associated with it a corresponding range amplitude; and for each target range estimate, estimating a velocity parameter based on location of peaks of an Np-point DFT of the range amplitudes across Np OFDM symbols.

19. The apparatus of claim 18, wherein the receiver processing stage is further configured for:

formulating a virtual array having a larger aperture than the ULA receive array; and using the virtual array and sparse signal recovery to refine the target elevation angle estimates.

20. The apparatus of claim 18, wherein the receiver processing stage is further configured for:

applying sparse signal recovery on at least some of the received subcarriers to determine if a received subcarrier contains only one nonzero element, wherein each received subcarrier containing only one nonzero element comprises a private subcarrier associated with a respective transmitting antenna, the symbol location of the nonzero element being indicative of the respective transmitting antenna.

* * * * *